United States Patent
Kainkaryam et al.

(10) Patent No.: US 9,983,323 B2
(45) Date of Patent: May 29, 2018

(54) PERFORMING TOMOGRAPHY TO BUILD ORTHORHOMBIC MODELS

(71) Applicant: Schlumberger Technology Corporation, Sugar Land, TX (US)

(72) Inventors: Sribharath Kainkaryam, Houston, TX (US); David Nichols, Houston, TX (US); Robert Bloor, Missouri City, TX (US); Marvin Decker, Houston, TX (US)

(73) Assignee: Schlumberger Technology Corporaton, Sugar Land, TX (US)

( * ) Notice: Subject to any disclaimer, the term of this patent is extended or adjusted under 35 U.S.C. 154(b) by 235 days.

(21) Appl. No.: 14/994,908

(22) Filed: Jan. 13, 2016

(65) Prior Publication Data
US 2016/0202374 A1    Jul. 14, 2016

Related U.S. Application Data

(60) Provisional application No. 62/103,423, filed on Jan. 14, 2015.

(51) Int. Cl.
*G01V 1/30*     (2006.01)

(52) U.S. Cl.
CPC .......... *G01V 1/303* (2013.01); *G01V 2210/51* (2013.01)

(58) Field of Classification Search
CPC .................................................... G01V 1/303
See application file for complete search history.

(56) References Cited

U.S. PATENT DOCUMENTS

| | | |
|---|---|---|
| 2009/0122646 A1 | 5/2009 | Lou et al. |
| 2010/0034052 A1 | 2/2010 | Pabon et al. |
| 2010/0133010 A1 | 6/2010 | Blias |
| 2012/0241166 A1 | 9/2012 | Sun |

FOREIGN PATENT DOCUMENTS

WO    2014164354 A1    10/2014

OTHER PUBLICATIONS

International Preliminary Report on Patentability for the equivalent International patent application PCT/US2016/013414 dated Jul. 27, 2017.
International Search Report issued in related PCT application PCT/US2016/013414 dated Mar. 30, 2016, 5 pages.

*Primary Examiner* — Douglas Menz
(74) *Attorney, Agent, or Firm* — Michael Guthrie

(57) ABSTRACT

Systems, methods, and computer-readable media for determining a velocity model. The method includes receiving a first velocity model having a first symmetry approximation of a media of a subterranean domain, receiving seismic data representing a subterranean formation, and determining, by operation of a processor, a second velocity model having a second symmetry approximation of the media, the second symmetry approximation being less symmetric than the first symmetry approximation. The second velocity model is determined based on an estimate of residual moveout as a function of azimuth and one or more differentials that relate one or more changes in residual moveout as a function of azimuth to one or more orthorhombic parameters. The method also including migrating the seismic data using the second velocity model.

24 Claims, 8 Drawing Sheets

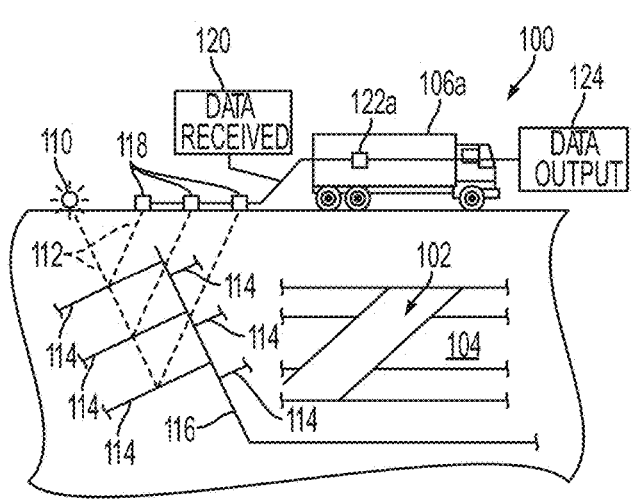
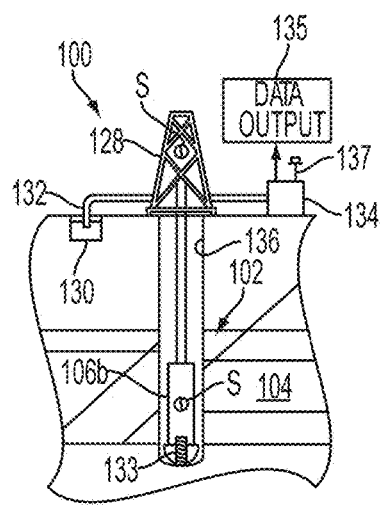
FIG. 1A
FIG. 1B
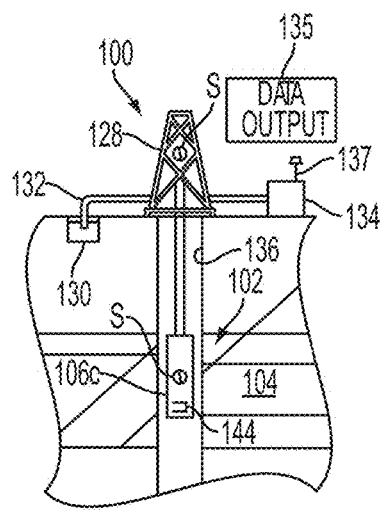
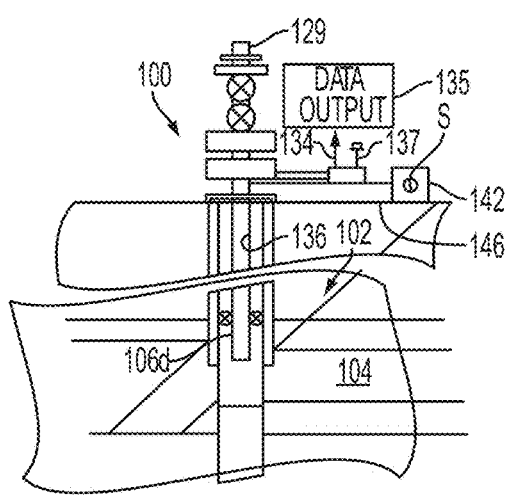
FIG. 1C
FIG. 1D

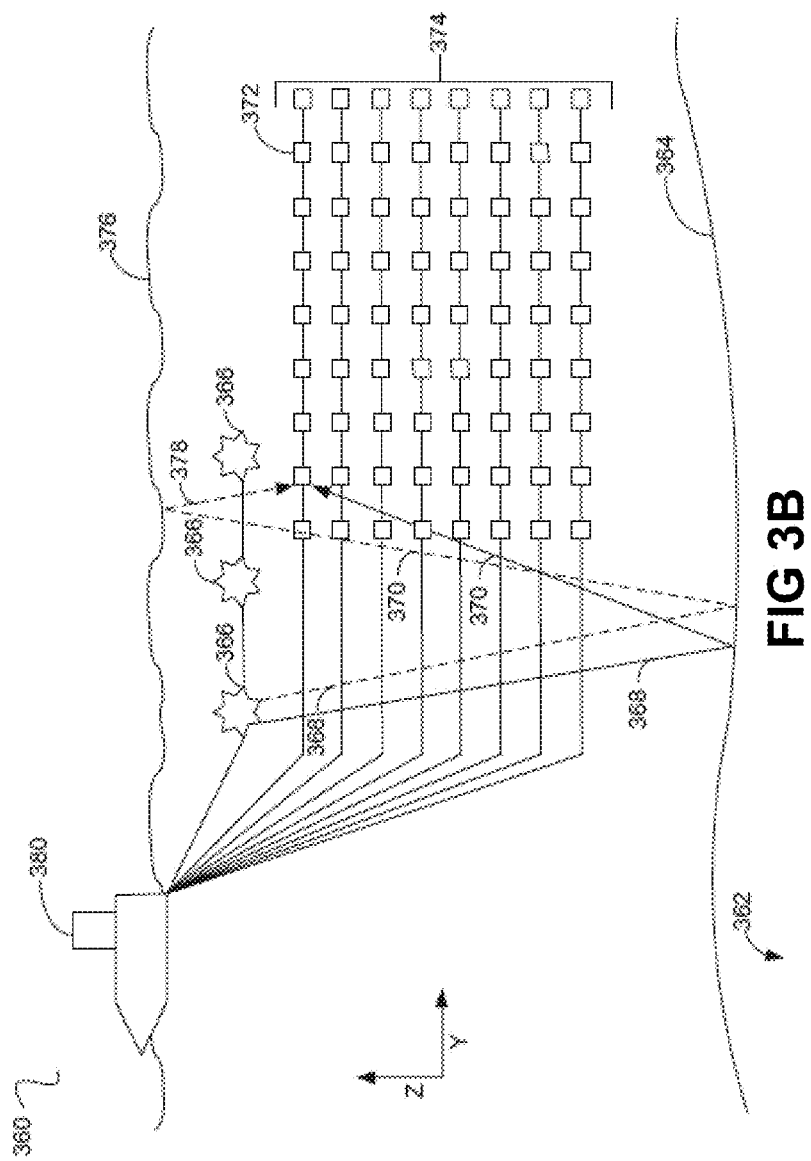

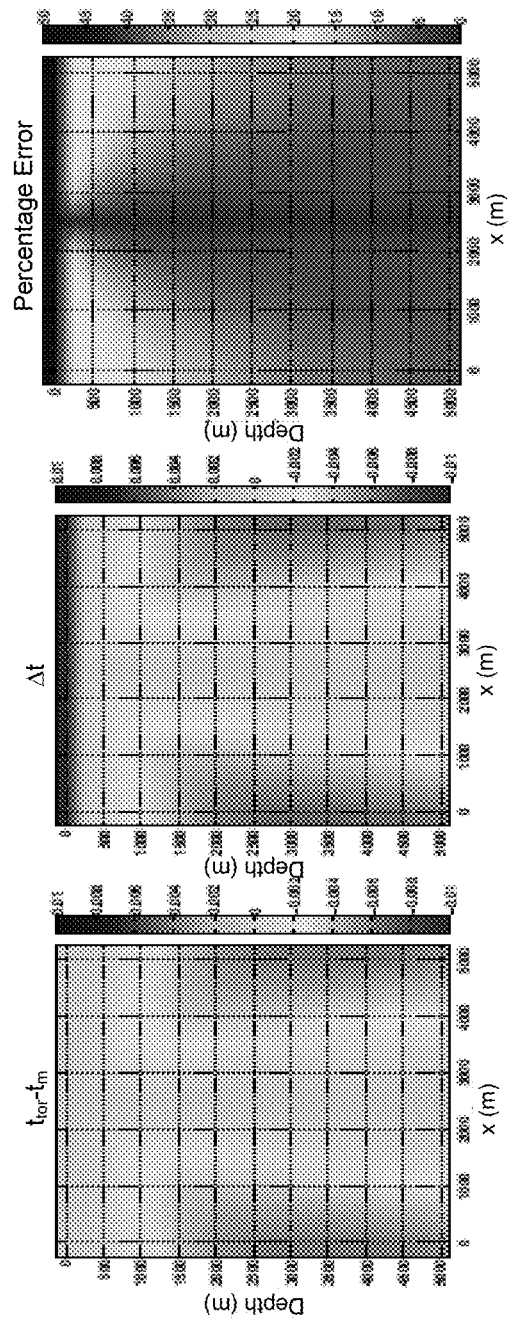

PERFORMING TOMOGRAPHY TO BUILD ORTHORHOMBIC MODELS

CROSS-REFERENCE TO RELATED APPLICATIONS

This application claims priority to U.S. Provisional Patent Application having Ser. No. 62/103,423, which was filed on Jan. 14, 2015 and is incorporated herein by reference in its entirety.

BACKGROUND

In seismic modeling, specifically, creating a velocity model of a subterranean domain, estimation of anisotropic parameters provides information useful for characterizing reservoirs, fractures, and fluids in reservoirs. For example, anisotropic models may be built in vertically transversely isotropic (VTI) and tilted transversely isotropic (TTI) media Recently, some wide-azimuth surveys have become available. Using seismic data from these surveys, anisotropic models of lower symmetry such as orthorhombic and monoclinic may be built. However, estimating orthorhombic anisotropic parameters in laterally varying media is still a challenge. In case of layered media, orthorhombic parameters may be estimated using a local one-dimensional, Dix-like inversion after performing depth migration. A generalized Dix inversion may be employed to characterize the normal moveout (NMO) ellipse using offset gathers.

Structurally transverse isotropic (STI) models may be built using multi-azimuth TTI tomography. Ellipses may then be fit to the estimated transversely isotropic anisotropic parameters to obtain anisotropic parameters defining orthorhombic anisotropy. Elliptical fitting, however, may be sensitive to the resolution of azimuthal sectors used in this type of workflow and in some cases resolution requirements may imply high costs with respect to user or compute time.

SUMMARY

Embodiments of the present disclosure may provide a method for determining a velocity model. The method includes receiving a first velocity model having a first symmetry approximation of a media of a subterranean domain, receiving seismic data representing a subterranean formation, and determining, by operation of a processor, a second velocity model having a second symmetry approximation of the media, the second symmetry approximation being less symmetric than the first symmetry approximation. The second velocity model is determined based on an estimate of residual moveout as a function of azimuth and one or more differentials that relate one or more changes in residual moveout as a function of azimuth to one or more orthorhombic parameters. The method also includes migrating the seismic data using the second velocity model.

In an embodiment, determining the second velocity model includes calculating the one or more differentials are based on a quadratic form that describes a magnitude and an orientation of a normal moveout ellipse with respect to an axis of the first velocity model.

In an embodiment, determining the second velocity model includes calculating the one or more differentials based on a polar representation of an orthorhombic anisotropy a tomography to compute an orthorhombic update to the first velocity model.

In an embodiment, determining the second velocity model further includes estimating the second model based on the one or more differentials and a tomography.

In an embodiment, the first symmetry approximation is a transversely isotropic approximation, and the second symmetry approximation an orthorhombic anisotropic approximation.

In an embodiment, the method further includes determining whether to update the second model after migrating the seismic data to the second model.

In an embodiment, determining whether to update the second model includes determining a model-error based on forward modeling the seismic data and a result of migrating the seismic data according to the second model.

In an embodiment, at least a portion of the seismic data is collected using one or more seismic receivers.

Embodiments of the disclosure may also provide a non-transitory computer-readable medium storing instructions that, when executed by at least one processor of a computing system, cause the computing system to perform operations. The operations include receiving a first velocity model having a first symmetry approximation of a media of a subterranean domain, receiving seismic data representing a subterranean formation, and determining a second velocity model having a second symmetry approximation of the media, the second symmetry approximation being less symmetric than the first symmetry approximation. The second velocity model is determined based on an estimate of residual moveout as a function of azimuth and one or more differentials that relate one or more changes in residual moveout as a function of azimuth to one or more orthorhombic parameters. The operations also include migrating the seismic data using the second velocity model.

Embodiments of the disclosure may also provide a computing system that includes one or more processors, and a memory system including one or more computer-readable media storing instructions that, when executed by at least one of the one or more processors, cause the computing system to perform operations. The operations include receiving a first velocity model having a first symmetry approximation of a media of a subterranean domain, receiving seismic data representing a subterranean formation, and determining a second velocity model having a second symmetry approximation of the media, the second symmetry approximation being less symmetric than the first symmetry approximation. The second velocity model is determined based on an estimate of residual moveout as a function of azimuth and one or more differentials that relate one or more changes in residual moveout as a function of azimuth to one or more orthorhombic parameters. The operations also include migrating the seismic data using the second velocity model.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIGS. 4A, 4B, and 4C illustrate an expected travel time update, an obtained travel time update, and a percentage of error, respectively, according to an embodiment.

DETAILED DESCRIPTION

Figure 2:
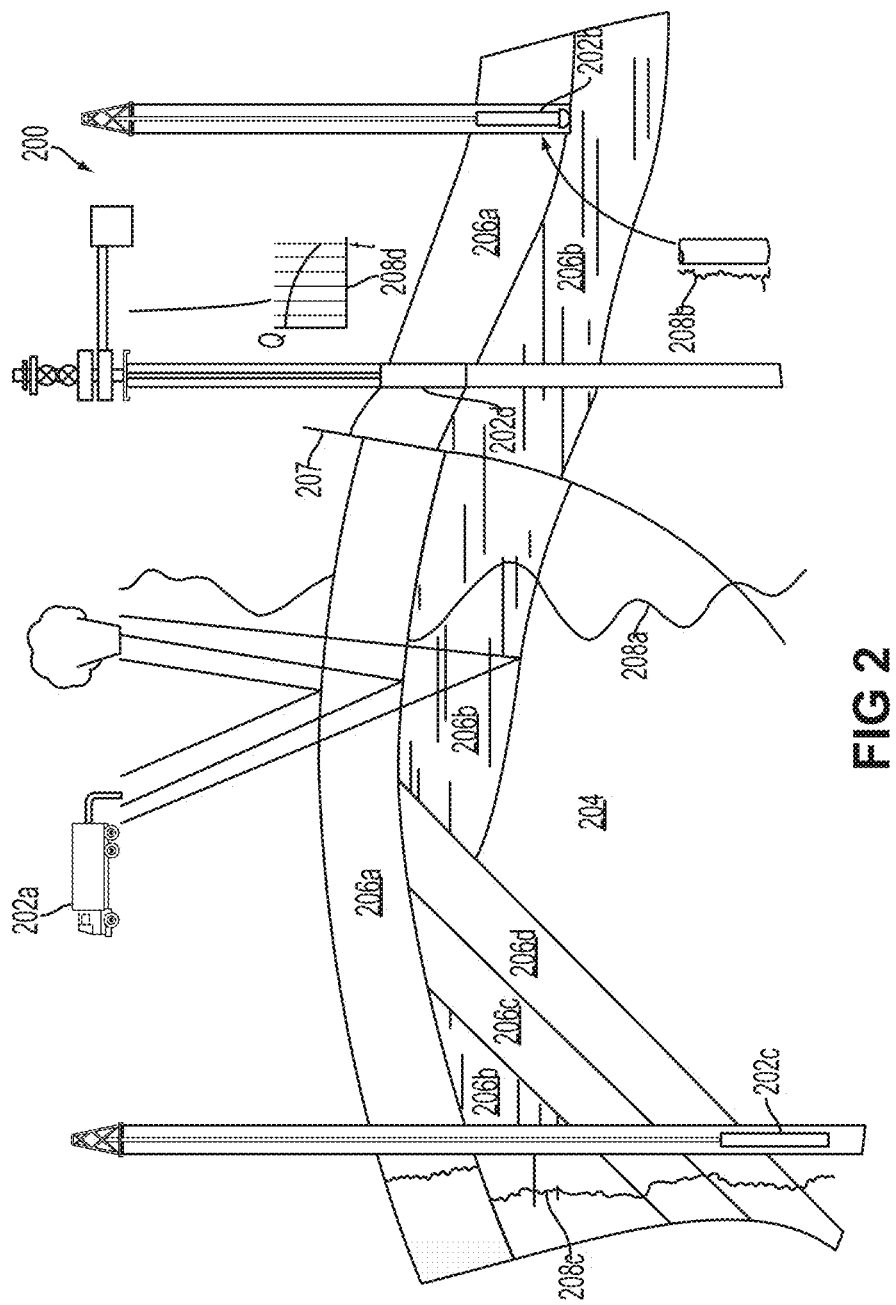

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
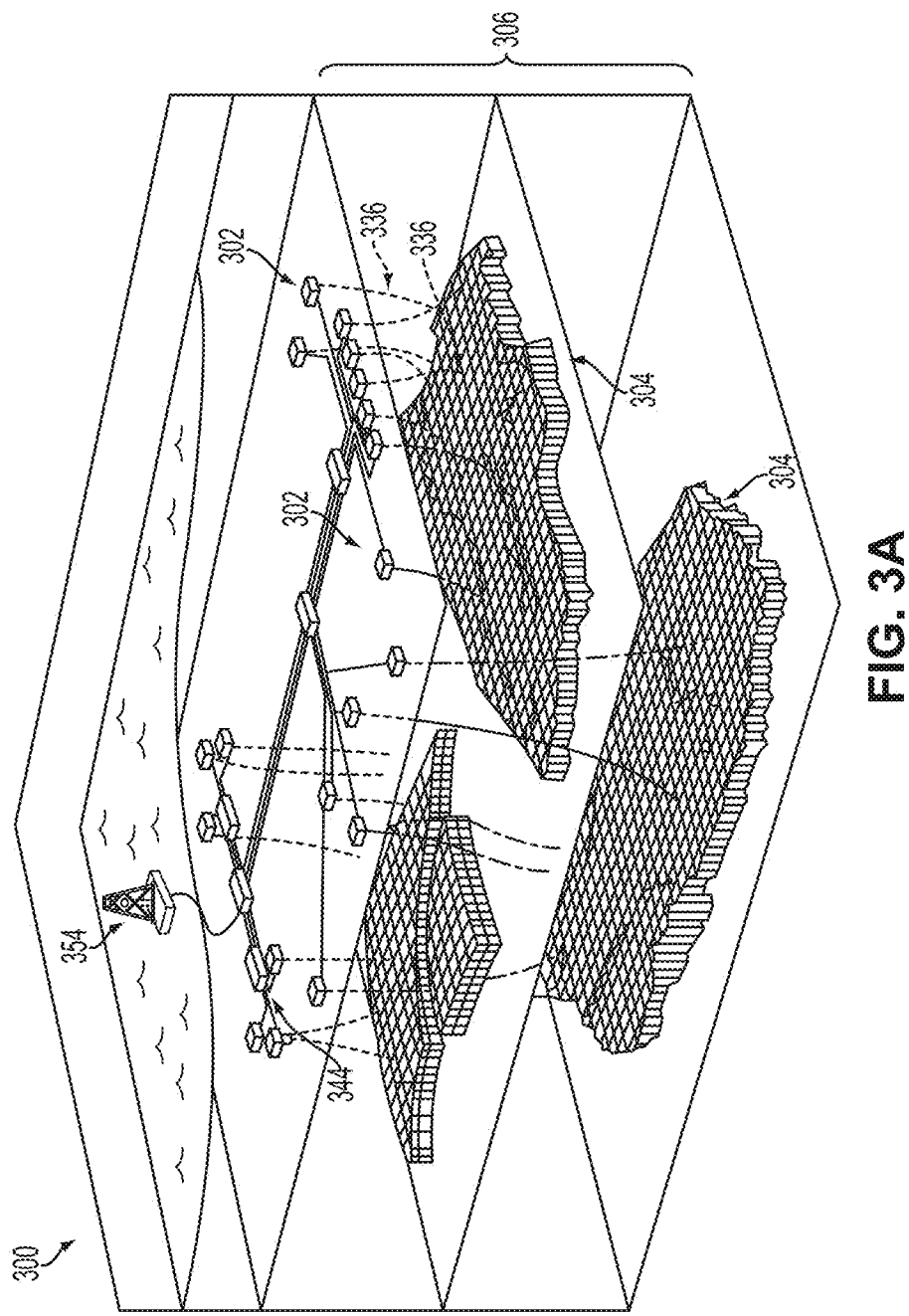

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Typically, marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure may provide a method for computing linearized tomographic updates. The method may use rays that make a small angle with the TTI symmetry axis to update a circular TTI delta to an ellipse representing azimuthal delta variation in a plane perpendicular to the (tilted) transversely isotropic axis. In some embodiments, the method may result in or otherwise include obtaining the orientation of the major axis of the elliptical variation in delta and determine the magnitudes of the axes of the normal moveout (NMO) ellipse. Once obtained, these parameters may be used to compute $d_1$ and $d_2$ in Tsvankin's formulation of orthorhombic anisotropy.

Phase velocity approximations may be derived following a first-order approach. For example, approximations for both the TTI and tilted orthorhombic (TOR) may be based on a first-order approach and ray tracing in continuously rotated coordinates.

Phase Velocity in Orthorhombic Media

The square of the phase velocity in an orthorhombic medium as a function of the unit-normalized phase slowness-$n=(n_2, n_2, n_3)$ in the orthorhombic coordinate system may be written as:

$$c^2 = V_{P0}^2[1+2(\varepsilon_2 n_1^2 + \varepsilon_2 n_2^2 + (\delta_1 - \varepsilon_1)n_2^2 n_3^2 + (\delta_2 - \varepsilon_2) n_3^2 n_1^2 + ((2\varepsilon_2 + 1)\delta_3 + \varepsilon_2 - \varepsilon_1) n_1^2 n_2^2] \quad (1)$$

Setting anellipticity ($n_3 = \delta_3 - \varepsilon_3$) in the [$x_1 - x_2$] plane to zero and rearranging the terms, Eq. 1 can be written as:

$$c^2 = V_{P0}^2\left[1 + 2\left((1-n_3^2)[n_1'\ n_2']\begin{bmatrix}E_{22} & E_{12}\\ E_{12} & E_{11}\end{bmatrix}\begin{bmatrix}n_1'\\ n_2'\end{bmatrix} + n_3^2[n_1'\ n_2']\begin{bmatrix}D_{22} & D_{12}\\ D_{12} & D_{11}\end{bmatrix}\begin{bmatrix}n_1'\\ n_2'\end{bmatrix}\right)\right] \quad (2)$$

The square of the phase velocity ($c^2$) in an orthorhombic medium in Eq. 2 has a simple physical meaning. It is the sum of the squares of the vertical velocity, elliptical part of the horizontal velocity and elliptical part of the NMO velocity.

Coordinate Frame Transformation from TTI to TOR

The transformation from a local TTI coordinate system to the local TOR coordinate system is defined by a rotation around the TTI symmetry axis. If the unit-normalized phase slowness vector in the spatially varying TI coordinate system is given by $[n'_1 n'_2 n'_3]^T$, the unit-normalized phase slowness vector in the orthorhombic coordinate system is given by the transformation:

$$\begin{bmatrix}n_1\\ n_2\end{bmatrix} = \begin{bmatrix}B_{11} & B_{12}\\ B_{21} & B_{22}\end{bmatrix}\begin{bmatrix}n_1'\\ n_2'\end{bmatrix} = B\begin{bmatrix}n_1'\\ n_2'\end{bmatrix} \quad (3)$$

$$n_3 = n_3'$$

where B is a 2×2 matrix defining the rotation from TTI to TOR coordinates for basis vectors perpendicular to the TI axis. The vertical component of the slowness vector is constant since the rotation is in the plane perpendicular to the TI axis.

Substituting equation 3 into equation 2, the phase velocity may be specified in terms of unit-normal phase slowness in the TI axis as:

$$c^2 = V_{P0}^2\left[1 + 2\left((1-n_3^2)[n_1'\ n_2']\begin{bmatrix}E_{22} & E_{12}\\ E_{12} & E_{11}\end{bmatrix}\begin{bmatrix}n_1'\\ n_2'\end{bmatrix} + n_3^2[n_1'\ n_2']\begin{bmatrix}D_{22} & D_{12}\\ D_{12} & D_{11}\end{bmatrix}\begin{bmatrix}n_1'\\ n_2'\end{bmatrix}\right)\right] \quad (4)$$

Here, $n_i$ are the components of unit slowness in the TTI basis. $E_{ij}$ and $D_{ij}$ are given by:

$$E = \begin{bmatrix}E_{22} & E_{12}\\ E_{12} & E_{11}\end{bmatrix} = B^T\begin{bmatrix}\varepsilon_2 & 0\\ 0 & \varepsilon_1\end{bmatrix}B \quad (5)$$

$$D = \begin{bmatrix}D_{22} & D_{12}\\ D_{12} & D_{11}\end{bmatrix} = B^T\begin{bmatrix}\delta_2 & 0\\ 0 & \delta_1\end{bmatrix}B$$

where B is the transformation from TTI coordinates to tilted orthorhombic coordinates. E and D are defined as quadratic forms of epsilon and delta respectively. Embodiments of the method may thus yield formulas for calculating updates in D and E. Further, E=εI and D=δI, where ε and δ are the TTI anisotropic parameters and B=I.

Evaluation of Travel Time Differentials

In an embodiment, E is sensitive to a choice of B when $\varepsilon_2 \neq \varepsilon_1$, the partial derivatives of the phase velocity c with respect to the entries of the quadratic form (D) may be written as:

$$\frac{\partial c}{\partial D_{11}} = \frac{V_{P0}^2 n_3^2 n_1'^2}{c} \quad (6)$$

$$\frac{\partial c}{\partial D_{12}} = \frac{2V_{P0}^2 n_3^2 n_1' n_2'}{c}$$

$$\frac{\partial c}{\partial D_{22}} = \frac{V_{P0}^2 n_3^2 n_2'^2}{c}$$

Using the above equations 6, travel time differentials with respect to D may be calculated using a chain rule. Travel time differentials enable the use of tomographic approach to solve for updates in $D_{11}$, $D_{12}$ and $D_{22}$. The updated quadratic form can be converted to orthorhombic parameters.

A system of differentials may derived as follows. The variation of velocity with respect to azimuth in an orthorhombic medium may be written with polar coordinates as:

$$V_P(\theta, \phi) = V_{P0}[1 + \delta(\phi)\sin^2\theta\cos^2\theta + \varepsilon(\phi)\sin^4\theta] \quad (7)$$

where $$\delta(\phi) = \delta^{(1)}\sin^2\phi + \delta^{(2)}\cos^2\phi,$$

$$\varepsilon(\phi) = \varepsilon^{(1)}\sin^4\phi + \varepsilon^{(2)}\cos^4\phi + (2\varepsilon^{(2)} + \delta^{(3)})\sin^2\phi\cos^2\phi$$

Here, φ denotes the angle from the axis of symmetry in the TI plane in an orthorhombic medium and theta denotes the angle from the TI axis. Ignoring epsilon and assuming that a property delta has been estimated such that $$\delta_1 = \delta - x$$

$$\delta_2 = \delta + x$$

and denoting the orientation of $\delta_2$ to be $\phi_0$:

$$\delta(\phi) = (\delta - x)\sin^2(\phi - \phi_0) + (\delta + x)\cos^2(\phi - \phi_0)$$

Rewriting this formulation yields an azimuthal expression for $\delta(\phi)$ in terms of $\phi_0$ and x:

$$\begin{aligned}\delta(\phi) &= (\delta - x)\sin^2(\phi - \phi_0) + (\delta + x)\cos^2(\phi - \phi_0) \quad (8)\\ &= \delta + x(\cos^2(\phi - \phi_0) - \sin^2(\phi - \phi_0))\\ &= \delta + x(\cos(2(\phi - \phi_0)))\\ &= \delta + x(\cos(2\phi)\cos(2\phi_0) + \sin(2\phi)\sin(2\phi_0))\\ &= \delta + \cos(2\phi)x_1 + \sin(2\phi)x_2\end{aligned}$$

In the final expression, $x_1$ denotes the production of x onto the axis determined by $2\phi_0$ and $x_2$ onto the orthogonal axis. Differentials for the phase velocity in terms of $x_1$ and $x_2$ may be given by $$\frac{\partial V(\theta, \phi)}{\partial x_1} = V_{P_0}\cos(2\phi)\sin^2(\theta)\cos^2(\theta) \quad (9)$$

$$\frac{\partial V(\theta, \phi)}{\partial x_2} = V_{P_0}\sin(2\phi)\sin^2(\theta)\cos^2(\theta) \quad (10)$$

As above, these differentials may be used with tomography to estimate $x_1$ and $x_2$, and can be then converted back into an orthorhombic model.

Validating Travel Time Differentials

Forward modeling tests may be employed to illustrate accuracy of an embodiment of the travel time differentials. Travel times may be computed in TTI and TOR models and the travel time updates may be computed by the sum of the product of travel time differentials and the update in the model properties over the model grid. Error in travel times may be computed as $$E(m_{TI}, m_{TOR}) = t_{TI} + \sum_{i=0}^{n}\frac{\partial t}{\partial m_i}\Delta m_i - t_{TOR} \quad (11)$$

where $\Delta m_i = m_{TORi} - m_{TIi}$ is the change in the model properties at a subsurface location. FIG. 4A shows the travel time update expected. The expected travel time update is computed as the difference between $t_{TOR}$ and $t_{TI}$. FIG. 4B illustrates the travel time update computed from the summation term in Equation 11. FIG. 4C shows the error in obtained travel time update as a fraction of the expected travel time update. As seen in FIG. 4C, the errors in the travel time updates computed from the differentials are accurate in a cone of 60° in the vicinity of the TI axis.

Tests on Synthetic Data

To illustrate the method, according to an embodiment, a single tomographic update with a synthetic dataset may be computed. Synthetic shot gathers were modeled from a series of density contrasts by a finite-differences implementation of elastic wave propagation in vertical orthorhombic media with $V_{P0}=2000$ m/s, $\varepsilon_1=\varepsilon_2=0{:}1$, $\delta_1=0{:}03$, $\delta_2=0{:}09$, $\delta_3=0{:}0$ and the quaternion describing the orientation by q=[1, 0, 0, 0]. Shot gathers were migrated using a Kirchoff depth migration algorithm with a TI model with $V_{P0}=2000$ m/s, $\varepsilon=0{:}1$ and $\delta=0{:}06$. TI axis was chosen to be vertical.

Figures 5A, 5B, 5C:
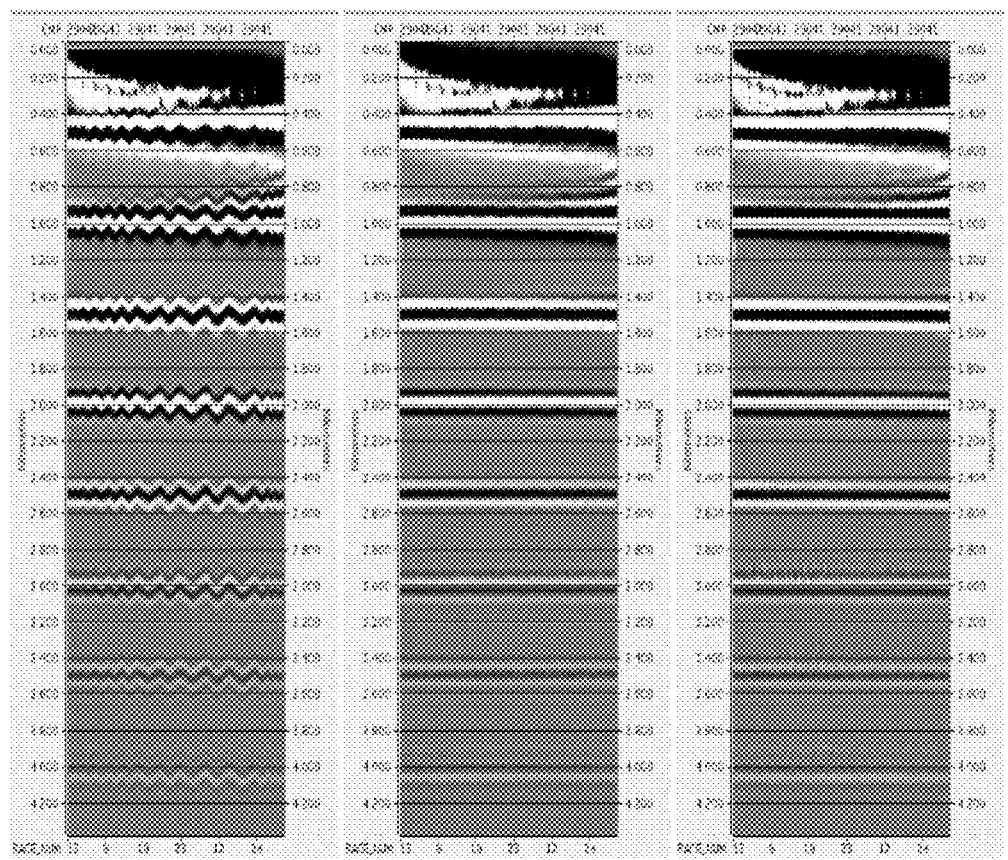
FIGS. 5A, 5B, and 5C illustrate spiral gathers after transversely isotropic (TI) migration, spiral gathers after quadratic tomography, and spiral gathers after orthorhombic migration, respectively, according to an embodiment.

FIG. 5A shows a spiral gather computed after migration in TI media. Using migrated offset gathers, reflection events were picked to measure residual moveout (RMO) and a single tomographic update was computed from the differentials described above for D. This update was applied to the initial TTI model to generate an updated orthorhombic model. FIG. 5B shows spiral gathers after migration with updated model. As may be appreciated, the residual moveout is attenuated with only a one iteration of tomography. For comparison, FIG. 5C shows the migrated image using the true orthorhombic model.

Embodiments of the disclosure may provide a method for computing the updates in the NMO ellipse to update a tilted transversely isotropic model to a tilted orthorhombic model. In some embodiments, the method operates on the residual moveout picks on post-migrated offset gathers and converts them to updates in quadratic forms describing the NMO ellipse. Further, the method may estimate the preferential direction in an orthorhombic model.

Figure 6:
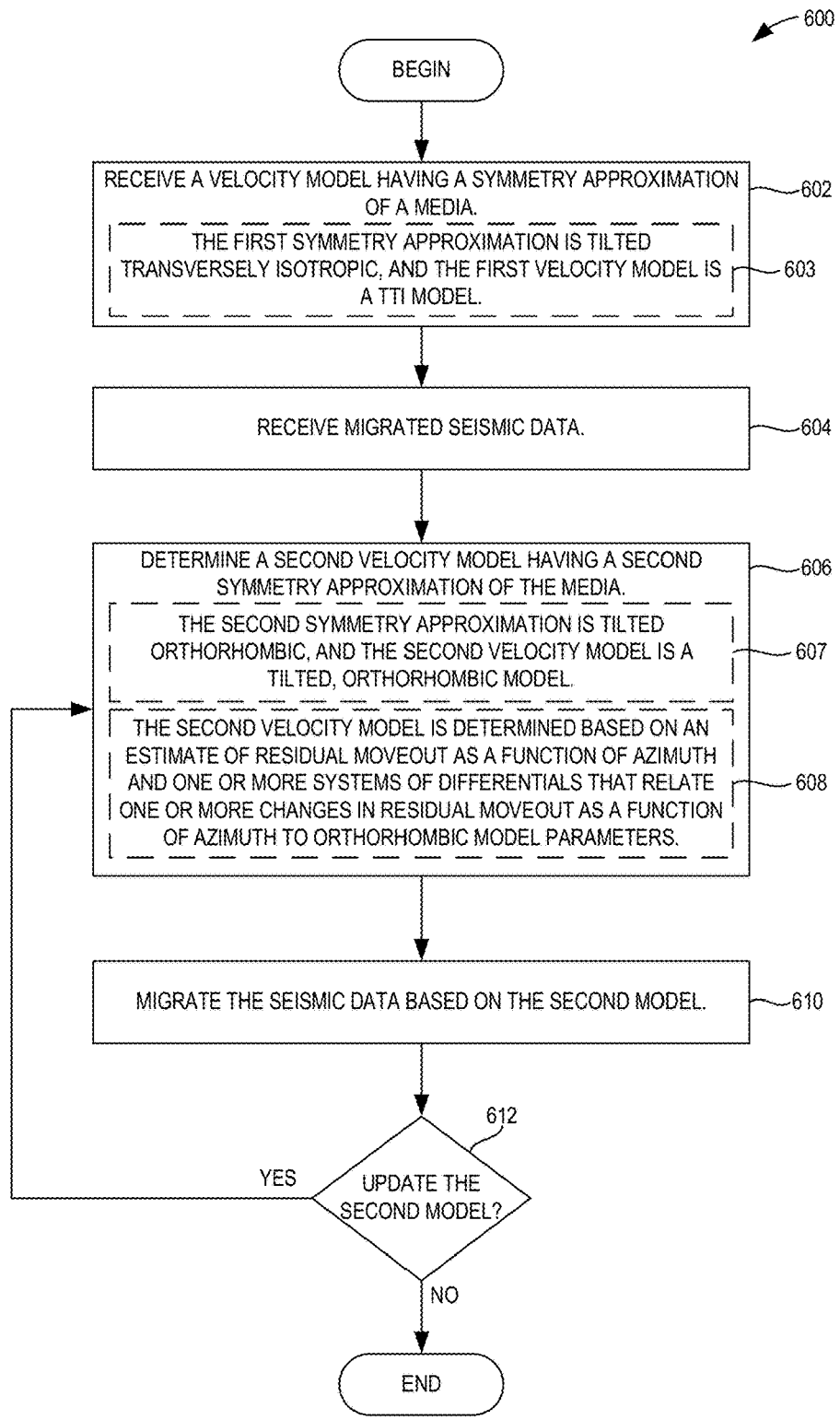
FIG. 6 illustrates a flowchart of a method for determining a velocity model, according to an embodiment.

FIG. 6 illustrates a flowchart of a method 600 for computing a velocity model of a subterranean domain, according to an embodiment. The method 600 may include receiving a velocity model having on a first symmetry approximation of a media of the subterranean domain, as at 602. The first symmetry may be transversely isotropic, e.g., tilted transversely isotropic (TTI), and thus the first model may be a TTI model, as indicated at 603.

The method 600 may also include receiving migrated seismic data, as at 604. The migrated seismic data may be provided as shot gathers, which may be collected using a geophone or another seismic receiver, as described above with reference to FIGS. 1A-3B. In addition, synthetic (modeled) data may also or instead be employed as the seismic data. The migrated seismic data may be migrated based on the first velocity model.

The method 600 may further include determining a second velocity model having a second symmetry approximation of the media, as at 606. The second symmetry approximation may be a relatively less symmetric approximation, as compared to the first symmetry approximation, such as tilted orthorhombic (TOR). As such, the second velocity model may be a TOR model, as at 607. In an embodiment, the second velocity model may be determined based on an estimate of residual moveout as a function of azimuth and one or more systems of differentials that relate one or more changes in residual moveout as a function of azimuth to one or more orthorhombic model parameters. This may be accomplished as described above.

The method 600 may also include migrating the seismic data based on the second model, as at 610. Further, the method 600 may include determining whether to update the second model, as at 612. For example, by forward modeling, an error may be established in the model. If this error exceeds an acceptable (e.g., predetermined) value, the method 600 may return to determining a second velocity model at 606. Otherwise, the method 600 may end or may include one or more other processes.

Figure 7:
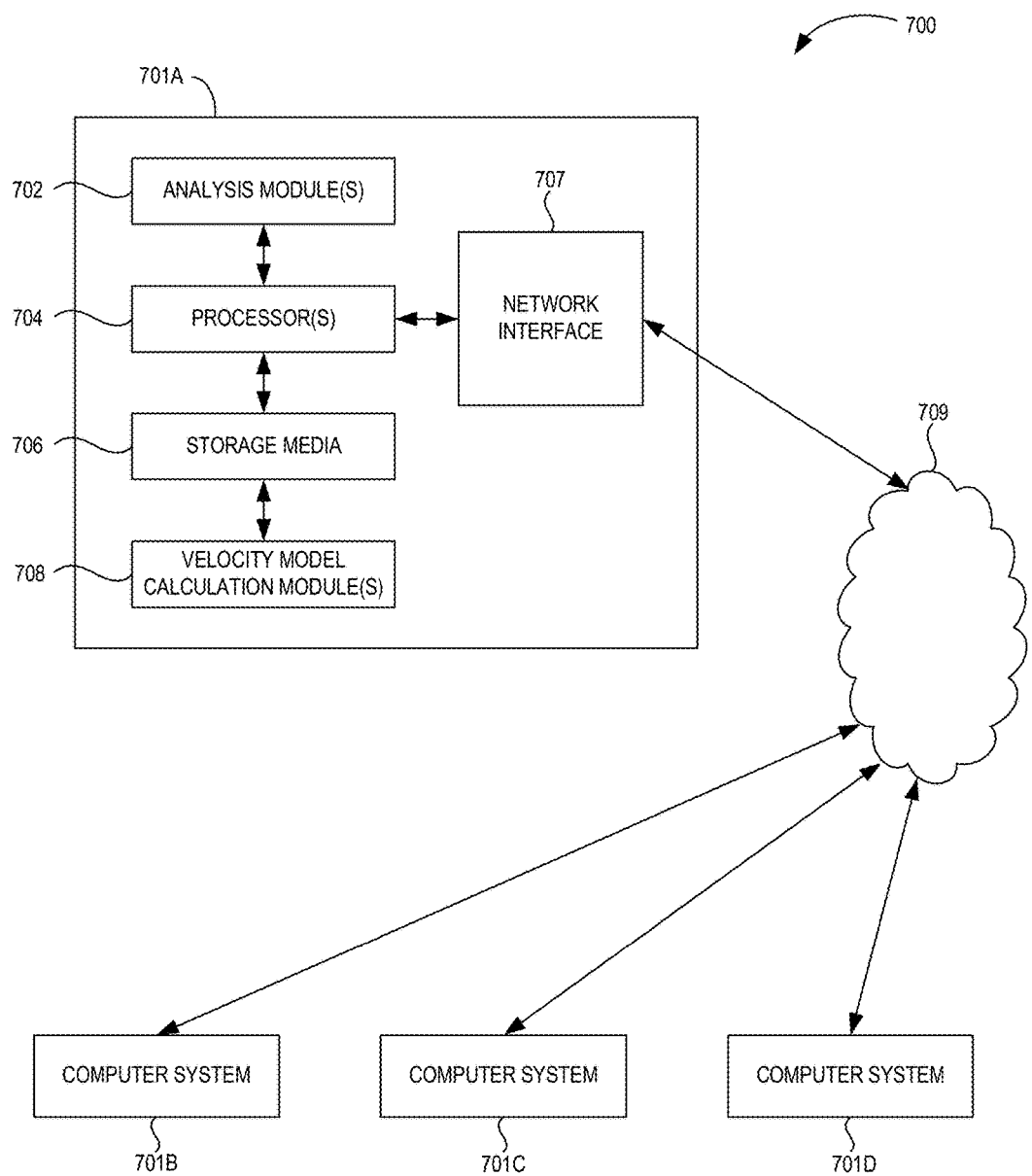
FIG. 7 illustrates a schematic view of such a computing or processor system, according to an embodiment.

It will be appreciated that one or more aspects of the method may be performed in combination or in a different order than described above. Further, in some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 4 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more velocity model calculation module(s) 708. In the example of computing system 700, computer system 701A includes the velocity model calculation module 708. In some embodiments, a single velocity model calculation module may be used to perform some or all aspects of one or more embodiments of the methods disclosed herein. In other embodiments, a plurality of velocity model calculation modules may be used to perform some or all aspects of methods disclosed herein.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, one or more aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to methods as discussed herein. This can include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for determining a velocity model, comprising:

receiving a first velocity model having a first symmetry approximation of a media of a subterranean domain;

receiving seismic data representing a subterranean formation;

determining, by operation of a processor, a second velocity model having a second symmetry approximation of the media, the second symmetry approximation being less symmetric than the first symmetry approximation, wherein the second velocity model is determined based on an estimate of residual moveout as a function of azimuth and one or more differentials that relate one or more changes in residual moveout as a function of azimuth to one or more orthorhombic parameters; and migrating the seismic data using the second velocity model.

2. The method of claim 1, determining the second velocity model comprises calculating the one or more differentials are based on a quadratic form that describes a magnitude and an orientation of a normal moveout ellipse with respect to an axis of the first velocity model.

3. The method of claim 1, wherein determining the second velocity model comprises calculating the one or more differentials based on a polar representation of an orthorhombic anisotropy a tomography to compute an orthorhombic update to the first velocity model.

4. The method of claim 1, wherein determining the second velocity model further comprises estimating the second model based on the one or more differentials and a tomography.

5. The method of claim 1, wherein the first symmetry approximation is a transversely isotropic approximation, and the second symmetry approximation an orthorhombic anisotropic approximation.

6. The method of claim 1, further comprising determining whether to update the second model after migrating the seismic data to the second model.

7. The method of claim 6, wherein determining whether to update the second model comprises determining a model-error based on forward modeling the seismic data and a result of migrating the seismic data according to the second model.

8. The method of claim 6, wherein at least a portion of the seismic data is collected using one or more seismic receivers.

9. The method of claim 1, further comprising generating a seismic image representing the subterranean domain using the seismic data that is moved-out using the second velocity model.

10. The method of claim 1, wherein the seismic data was collected using one or more seismic sensors deployed near the subterranean domain.

11. The method of claim 5, wherein determining the orthorhombic anisotropic approximation comprises transforming from a local tilted transversely isotropic (TTI) coordinate system to a local tilted orthorhombic coordinate system by rotating around a TTI symmetry axis.

12. The method of claim 1, wherein determining the second velocity model comprises:
picking reflection events to measure residual moveout after migration using the first velocity model;
calculating a tomographic update based on the one or more differentials; and
applying the tomographic update to the first velocity model to generate the second model.

13. A non-transitory computer-readable medium storing instructions that, when executed by at least one processor of a computing system, cause the computing system to perform operations, the operations comprising
receiving a first velocity model having a first sym. approximation of a media of a subterranean domain;
receiving seismic data representing a subterranean formation;
determining, by operation of a processor, a second velocity model having a second symmetry approximation of the media, the second symmetry approximation being less symmetric than the first symmetry approximation, wherein the second velocity model is determined based on an estimate of residual moveout as a function of azimuth and one or more differentials that relate one or more changes in residual moveout as a function of azimuth to one or more orthorhombic parameters; and
migrating the seismic data using the second velocity model.

14. The medium of claim 13, wherein determining the second velocity model comprises calculating the one or more differentials are based on a quadratic form that describes a magnitude and an orientation of a normal moveout ellipse with respect to an axis of the first velocity model.

15. The medium of claim 13, wherein determining the second velocity model comprises calculating the one or more differentials based on a polar representation of an orthorhombic anisotropy a tomography to compute an orthorhombic update to the first velocity model.

16. The medium of claim 13, wherein determining the second velocity model further comprises estimating the second model based on the one or more differentials and a tomography.

17. The medium of claim 13, wherein the first symmetry approximation is a transversely isotropic approximation, and the second symmetry approximation an orthorhombic anisotropic approximation.

18. The medium of claim 13, wherein the operations further comprise determining whether to update the second model after migrating the seismic data to the second model.

19. The medium of claim 18, wherein determining whether to update the second model comprises determining a model-error based on forward modeling the seismic data and a result of migrating the seismic data according to the second model.

20. The medium of claim 18, wherein at least a portion of the seismic data is collected using one or more seismic receivers.

21. A computing system comprising:
one or more processors; and
a memory system comprising one or more computer-readable media storing instructions that, when executed by at least one of the one or more processors, cause the computing system to perform operations, the operations comprising:
receiving a first velocity model having a first symmetry approximation of a media of a subterranean domain;
receiving seismic data representing the subterranean domain;
determining a second velocity model having a second symmetry approximation of the media, the second symmetry approximation being less symmetric than the first symmetry approximation, wherein the second velocity model is determined based on an estimate of residual moveout as a function of azimuth and one or more differentials that relate one or more changes in residual moveout as a function of azimuth to one or more orthorhombic parameters; and
migrating the seismic data using the second velocity model.

22. The system of claim 21, wherein determining the second velocity model comprises calculating the one or more differentials are based on a quadratic form that describes a magnitude and an orientation of a normal moveout ellipse with respect to an axis of the first velocity model.

23. The system of claim 21, wherein determining the second velocity model comprises calculating the one or more differentials based on a polar representation of an orthorhombic anisotropy a tomography to compute an orthorhombic update to the first velocity model.

24. The system of claim 21, wherein determining the second velocity model further comprises estimating the second model based on the one or more differentials and a tomography.

* * * * *